US010626269B2

(12) United States Patent
Yamanaka et al.

(10) Patent No.: US 10,626,269 B2
(45) Date of Patent: Apr. 21, 2020

(54) POLYESTER RESIN COMPOSITION AND METHOD FOR PRODUCING SAME

(71) Applicant: Mitsubishi Engineering-Plastics Corporation, Minato-ku (JP)

(72) Inventors: Yasushi Yamanaka, Hiratsuka (JP); Masaya Yamashita, Hiratsuka (JP); Kouichi Sakogawa, Hiratsuka (JP); Osamu Takise, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 50 days.

(21) Appl. No.: 15/748,775

(22) PCT Filed: Aug. 26, 2016

(86) PCT No.: PCT/JP2016/074932
§ 371 (c)(1),
(2) Date: Jan. 30, 2018

(87) PCT Pub. No.: WO2017/043334
PCT Pub. Date: Mar. 16, 2017

(65) Prior Publication Data
US 2019/0010325 A1    Jan. 10, 2019

(30) Foreign Application Priority Data

Sep. 11, 2015  (JP) .................................. 2015-179169
Sep. 11, 2015  (JP) .................................. 2015-179170
Mar. 31, 2016  (JP) .................................. 2016-071865

(51) Int. Cl.
*C08L 67/02*        (2006.01)
*C08J 3/20*         (2006.01)
(Continued)

(52) U.S. Cl.
CPC ................. *C08L 67/02* (2013.01); *C08J 3/20* (2013.01); *C08K 5/521* (2013.01); *C08L 33/16* (2013.01);
(Continued)

(58) Field of Classification Search
CPC ...... C08L 67/02; C08L 33/16; C08L 2201/02; C08K 5/521; C08J 3/20; C08F 2500/04
See application file for complete search history.

(56) References Cited

U.S. PATENT DOCUMENTS

| | | | | |
|---|---|---|---|---|
| 4,211,730 A | * | 7/1980 | Vollkommer | ........... C08F 20/22 260/DIG. 24 |
| 6,627,690 B1 | * | 9/2003 | Hironaka | ................ C08L 67/02 524/412 |

(Continued)

FOREIGN PATENT DOCUMENTS

| | | |
|---|---|---|
| CA | 2 355 274 A1 | 6/2000 |
| CN | 1357027 A | 7/2002 |

(Continued)

OTHER PUBLICATIONS

International Search Report dated Nov. 15, 2016 in PCT/JP2016/074932 filed Aug. 26, 2016.
Extended European Search Report dated Mar. 20, 2019 in Patent Application No. 16844197.0, 6 pages.

*Primary Examiner* — Andrew J. Oyer
(74) *Attorney, Agent, or Firm* — Oblon, McClelland, Maier & Neustadt, L.L.P.

(57) ABSTRACT

Provided are: a polyester resin composition that exhibits excellent flame retardancy and melt thermal stability and also exhibits excellent laser markability; and a method for producing same. The present invention provides: a polyester resin composition containing 3 to 60 parts by mass of a brominated polyacrylate flame retardant (B) relative to 100 parts by mass of a thermoplastic polyester resin (A), this (Continued)

brominated polyacrylate flame retardant (B) having a Na element concentration of 5 to 4000 ppm, as measured by X-Ray fluorescence analysis; and a production method including washing the brominated polyacrylate flame retardant (B) with hot water having a temperature of 40° C. to 100° C., then drying the washed product, and then mixing the dried product with the thermoplastic polyester resin (A).

9 Claims, 1 Drawing Sheet

(51) Int. Cl.
  *C08K 5/521* (2006.01)
  *C08L 33/16* (2006.01)

(52) U.S. Cl.
  CPC ....... *C08F 2500/04* (2013.01); *C08L 2201/02* (2013.01)

(56) References Cited

U.S. PATENT DOCUMENTS

| | | | |
|---|---|---|---|
| 2015/0259440 A1* | 9/2015 | Croitoru | C08F 220/24 523/222 |
| 2017/0321029 A1* | 11/2017 | Sudo | C08J 3/20 |

FOREIGN PATENT DOCUMENTS

| | | |
|---|---|---|
| EP | 0 796 743 A1 | 9/1997 |
| GB | 2 018 750 A | 10/1979 |
| JP | 54-138531 A | 10/1979 |
| JP | 11-106615 A | 4/1999 |
| JP | 11-279381 A | 10/1999 |
| JP | 2005-154570 A | 6/2005 |
| JP | 2005-162887 A | 6/2005 |
| JP | 2010-132930 A | 6/2010 |
| JP | 2013-57009 A | 3/2013 |
| JP | 2016-28120 A | 2/2016 |
| JP | 2016-141775 A | 8/2016 |
| WO | WO 00/36013 A2 | 6/2000 |
| WO | 2014/061010 A1 | 4/2014 |

* cited by examiner

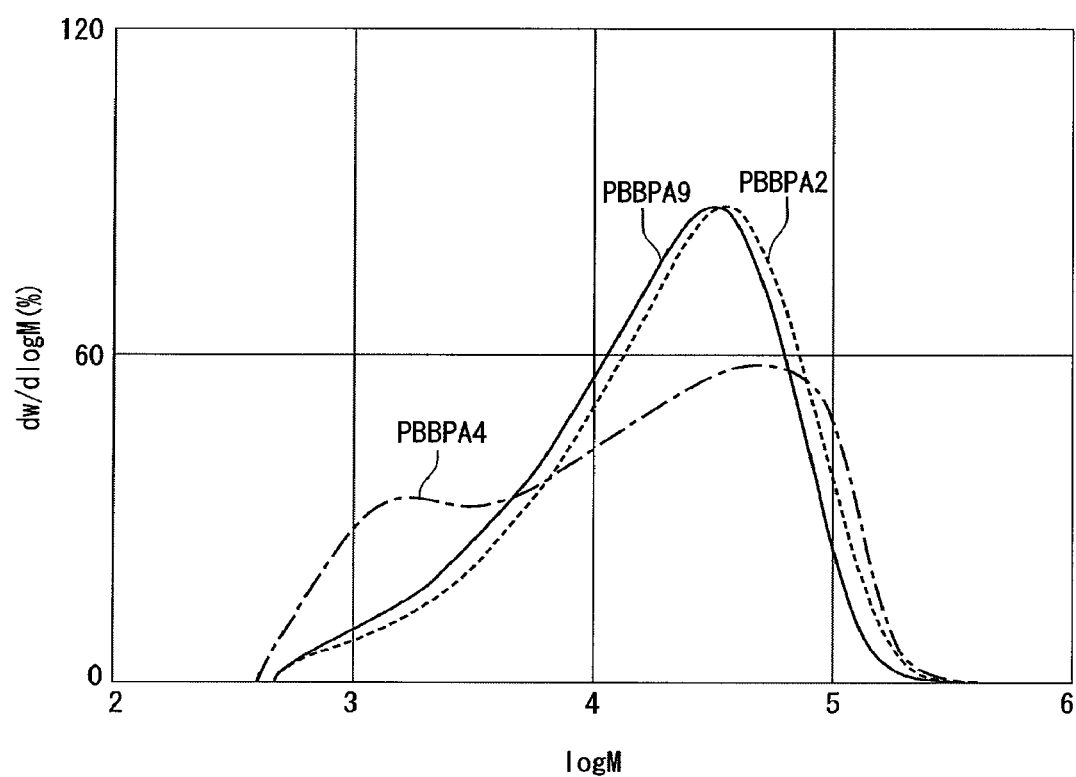

POLYESTER RESIN COMPOSITION AND METHOD FOR PRODUCING SAME

CROSS-REFERENCE TO RELATED APPLICATIONS

This application is a National Stage of PCT/JP2016/074932, which was filed on Aug. 26, 2016. This application is based on and claims the benefit of priority to Japanese Application No. 2016-071865 which was filed on Mar. 31, 2016, and to Japanese Application No. 2015-179170 which was filed on Sep. 11, 2015, and to Japanese Application No. 2015-179169 which was filed on Sep. 11, 2015.

TECHNICAL FIELD

The present invention relates to a polyester resin composition and a method for producing same. More specifically the present invention relates to a polyester resin composition which exhibits excellent flame retardancy and melt thermal stability, hardly corrodes metal components even when used for a long time in proximity to metal components, and also exhibits excellent melt thermal stability and laser markability, and relates to a method for producing same.

BACKGROUND ART

Thermoplastic polyester resins such as polybutylene terephthalate and polyethylene terephthalate exhibit excellent mechanical strength, chemical resistance, electrical insulating properties, and the like, and also exhibit excellent heat resistance, moldability and recyclability, and are therefore widely used in components for electrical and electronic equipment, and components for motor vehicles, and also in electrical equipment components, mechanical components, and the like.

As the size and thickness of components of electrical and electronic devices has significantly decreased in recent years, there have been demands for a high degree of flame retardancy at low component thicknesses, and there have been demands to achieve the V-0 rank in the vertical combustion test defined in UL94. Flame retardants are blended in order to render thermoplastic resins flame-retardant.

In PTL 1, the applicant of the present application proposed a polyester resin composition which contains a specific quantity of a bromine-based flame retardant in a thermoplastic polyester resin, in which the quantity of free bromine is a specific quantity or less, and in which the yellow index of the resin composition is 23 or less. In this invention, a brominated benzyl poly(meth)acrylate such as pentabromobenzyl polyacrylate, a brominated epoxy compound, a brominated polystyrene or a brominated imide compound is specifically preferred as the bromine-based flame retardant, and a brominated polystyrene is particularly preferred (see PTL 1: paragraph [0022]).

However, when this brominated polyacrylate flame retardant that is said to be a preferred flame retardant was blended and compounded in a thermoplastic polyester resin, it was found that the thermoplastic polyester resin readily decomposed or underwent a deterioration in melt thermal stability.

In addition, when exposed to high temperatures during molding, it was found that corrosive gases were generated during the molding, which brought about problems such as mold contamination and appearance defects on the surface of a molded article. Furthermore, in the case of electrical equipment components and the like, such resin compositions are often used in close proximity to metal components such as terminals, and it was found that long-term use led to problems such as nearby metal components being corroded.

In addition, manufacturers' names, brand names, part numbers, manufacturing lot numbers, and the like, are generally marked on equipment components, but laser marking, which uses high marking speeds, has become widely used recently. As a result of miniaturization of components in particular, there have been demands for clearer marking, and there have been demands for superior laser markability from the perspective of improving productivity by improving marking speed.

Therefore, in cases where a brominated polyacrylate flame retardant is used in a thermoplastic polyester resin, it is of course essential to achieve excellent flame retardancy, but also essential to reduce the quantity of gas generated during molding and achieve excellent laser markability.

CITATION LIST

Patent Literature

[PTL 1] Japanese Patent Application Publication No. 2013-57009

SUMMARY OF INVENTION

Technical Problem

The purpose of (problem to be addressed by) the present invention is to provide a polyester resin composition that exhibits excellent flame retardancy, melt thermal stability and laser markability, and a method for producing same.

Solution to Problem

As a result of diligent research into how to solve the problem mentioned above, the inventors of the present invention have found that Na was mixed in a brominated polyacrylate flame retardant during the production process, found that the quantity of Na was closely related to the thermal stability of the thermoplastic polyester resin and affected laser markability, found that there was a suitable value for the concentration of Na element, and thereby completed the present invention.

The present invention is as follows.

[1] A polyester resin composition containing 3 to 60 parts by mass of a brominated polyacrylate flame retardant (B) relative to 100 parts by mass of a thermoplastic polyester resin (A), the brominated polyacrylate flame retardant (B) having a Na element concentration of 5 to 4000 ppm, as measured by X-Ray fluorescence analysis.

[2] The polyester resin composition according to [1] above, wherein the brominated polyacrylate flame retardant (B) has a Na element concentration of 100 to 1500 ppm.

[3] The polyester resin composition according to [1] or [2] above, wherein the brominated polyacrylate flame retardant (B) has a Mg ion concentration of 5 to 2000 ppm and an Al ion concentration of 5 to 3000 ppm, as measured by ICP emission spectrometry.

[4] The polyester resin composition according to any one of [1] to [3] above, wherein the brominated polyacrylate flame retardant (B) is pentabromobenzyl polyacrylate.

[5] The polyester resin composition according to any one of [1] to [4] above, wherein the brominated polyacrylate flame retardant (B) contains sodium bromide.

[6] The polyester resin composition according to any one of [1] to [5] above, further containing a phosphate stabilizer (C).

[7] The polyester resin composition according to any one of [1] to [6] above, wherein the brominated polyacrylate flame retardant (B) has a ratio (Mw/Mn) of mass average molecular weight (Mw) to number average molecular weight (Mn) of 5.5 or less.

[8] The polyester resin composition according to any one of [1] to [7] above, wherein the brominated polyacrylate flame retardant (B) has a mass average molecular weight (Mw), as measured by GPC, of 10000 or more.

[9] A polyester resin composition containing 3 to 60 parts by mass of a brominated polyacrylate flame retardant (B) relative to 100 parts by mass of a thermoplastic polyester resin (A), the resin composition having a Na element concentration of 1 to 400 ppm, as measured by atomic absorption spectroscopy.

[10] A method for producing a polyester resin composition containing 3 to 60 parts by mass of a brominated polyacrylate flame retardant (B) relative to 100 parts by mass of a thermoplastic polyester resin (A), the method including washing the brominated polyacrylate flame retardant (B) with hot water having a temperature of 40° C. to 100° C., then drying the washed product, and then mixing the dried product with the thermoplastic polyester resin (A).

Advantageous Effects of Invention

The polyester resin composition of the present invention exhibits excellent flame retardancy, causes little mold corrosion during molding, hardly corrodes metal components even when used for a long time in proximity to metal components, and also exhibits excellent melt thermal stability and laser markability.

BRIEF DESCRIPTION OF THE DRAWINGS

FIG. 1 is a GPC chart of pentabromobenzyl polyacrylate, which is used in the examples and comparative examples.

DESCRIPTION OF EMBODIMENTS

A first aspect of the polyester resin composition of the present invention contains 3 to 60 parts by mass of a brominated polyacrylate flame retardant (B) relative to 100 parts by mass of a thermoplastic polyester resin (A), wherein the brominated polyacrylate flame retardant (B) has a Na element concentration of 5 to 4000 ppm, as measured by X-Ray fluorescence analysis.

In addition, a second aspect of the polyester resin composition of the present invention contains 3 to 60 parts by mass of a brominated polyacrylate flame retardant (B) relative to 100 parts by mass of a thermoplastic polyester resin (A), wherein the resin composition has a Na element concentration of 1 to 400 ppm, as measured by atomic absorption spectroscopy.

Furthermore, the method for producing a polyester resin composition of the present invention is a method for producing a polyester resin composition which contains 3 to 60 parts by mass of a brominated polyacrylate flame retardant (B) relative to 100 parts by mass of a thermoplastic polyester resin (A), the method being characterized by washing the brominated polyacrylate flame retardant (B) with hot water having a temperature of 40° C. to 100° C., then drying the washed product, and then mixing the dried product with the thermoplastic polyester resin (A).

Details of the present invention will now be explained in detail.

Explanations of the constituent features described below are based on representative embodiments and specific examples of the present invention, but it should be understood that the present invention is not limited to such embodiments or specific examples. Moreover, use of "-" in the present specification means that numerical values mentioned before and after the "-" include the lower limit and upper limit thereof, and "ppm" means ppm by mass.

[Thermoplastic Polyester Resin (A)]

The thermoplastic polyester resin (A) that is the primary component of the resin composition of the present invention is a polyester obtained by polycondensation of a dicarboxylic acid compound and a dihydroxy compound, polycondensation of an oxycarboxylic acid compound or polycondensation of these compounds, and may be a homopolyester or copolyester.

The dicarboxylic acid compound that constitutes the thermoplastic polyester resin (A) is preferably an aromatic dicarboxylic acid or an ester-forming derivative thereof.

Examples of aromatic dicarboxylic acids include terephthalic acid, isophthalic acid, orthophthalic acid, 1,5-naphthalenedicarboxylic acid, 2,5-naphthalenedicarboxylic acid, 2,6-naphthalenedicarboxylic acid, biphenyl-2,2'-dicarboxylic acid, biphenyl-3,3'-dicarboxylic acid, biphenyl-4,4'-dicarboxylic acid, diphenyl ether-4,4'-dicarboxylic acid, diphenylmethane-4,4'-dicarboxylic acid, diphenylsulfone-4,4'-dicarboxylic acid, diphenylisopropylidene-4,4'-dicarboxylic acid, 1,2-bis(phenoxy)ethane-4,4'-dicarboxylic acid, anthracene-2,5-dicarboxylic acid, anthracene-2,6-dicarboxylic acid, p-terphenylene-4,4'-dicarboxylic acid and pyridine-2,5-dicarboxylic acid. Of these, terephthalic acid can be advantageously used.

It is possible to use a mixture of two or more of these aromatic dicarboxylic acids. As is well known, these aromatic dicarboxylic acids can be used in polycondensation reactions as ester-forming derivatives such as dimethyl esters in addition to free acids.

Moreover, small quantities of one or more aliphatic dicarboxylic acids such as adipic acid, azelaic acid, dodecanedioic acid and sebacic acid and alicyclic dicarboxylic acids such as 1,2-cyclohexanedie carboxylic acid, 1,3-cyclohexanedicarboxylic acid and 1,4-cyclohexanedicarboxylic acid can be used together with these aromatic dicarboxylic acids.

Examples of the dihydroxy compound that constitutes the thermoplastic polyester resin (A) include aliphatic diols such as ethylene glycol, propylene glycol, butane diol, hexylene glycol, neopentyl glycol, 2-methylpropane-1,3-diol, diethylene glycol and triethylene glycol, and alicyclic diols such as cyclohexane-1,4-dimethanol, and mixture thereof. Moreover, it is possible to copolymerize a small quantity of one or more long chain diols having molecular weights of 400 to 6000, such as polyethylene glycol, poly-1,3-propylene glycol and polytetramethylene glycol.

In addition, it is possible to use an aromatic diol such as hydroquinone, resorcin, naphthalene diol, dihydroxydiphenyl ether or 2,2-bis(4-hydroxyphenyl)propane.

In addition to difunctional monomers such as those mentioned above, it is possible to additionally use a small quantity of a trifunctional monomer, such as trimellitic acid, trimesic acid, or trimethylolpropane; and pyromellitic acid, pentaerythritol in order to introduce a branched structure, or a monofunctional compound such as a fatty acid in order to adjust molecular weight.

A resin comprising mainly a polycondensation product of a dicarboxylic acid and a diol, that is, a resin in which 50 mass % or more, preferably 70 mass % or more is generally used as the thermoplastic polyester resin (A). The dicarboxylic acid is preferably an aromatic carboxylic acid, and the diol is preferably an aliphatic diol.

Of these, a polyalkylene terephthalate in which 95 mol. % or more of the acid component is terephthalic acid and 95 mass % or more of the alcohol component is an aliphatic diol is preferred. Polybutylene terephthalate and polyethylene terephthalate are representative examples thereof. These are preferably close to homopolyesters, that is, homopolyesters in which 95 mass % or more of the overall resin comprises a terephthalic acid component and a 1,4-butane diol component or ethylene glycol component.

The intrinsic viscosity of the thermoplastic polyester resin (A) is preferably 0.3 to 2 dl/g. If a resin having an intrinsic viscosity of less than 0.3 dl/g is used, the obtained resin composition tends to have low mechanical strength. In addition, if a resin having an intrinsic viscosity of more than 2 dl/g is used, the fluidity and moldability of the resin composition may deteriorate. From the perspectives of moldability and mechanical properties, the intrinsic viscosity is more preferably 0.4 dl/g or more, further preferably 0.5 dl/g or more, and particularly preferably 0.6 dl/g or more, and is more preferably 1.5 dl/g or less, further preferably 1.2 dl/g or less, and particularly preferably 0.8 dl/g or less.

The intrinsic viscosity of the thermoplastic polyester resin (A) is a value measured at 30° C. in a mixed solvent comprising tetrachloroethane and phenol at a mass ratio of 1:1.

The amount of terminal carboxyl groups in the thermoplastic polyester resin (A) can be selected and decided as appropriate, but is generally 60 eq/ton or less, preferably 50 eq/ton or less, and more preferably 30 eq/ton or less. If this amount exceeds 50 eq/ton, gas is readily generated during melt-processing the resin composition. The lower limit for the amount of terminal carboxyl groups is not particularly limited, but is generally 3 eq/ton, preferably 5 eq/ton, and more preferably 10 eq/ton.

The amount of terminal carboxyl groups in the thermoplastic polyester resin (A) is a value obtained by dissolving 0.5 g of resin in 25 mL of benzyl alcohol, and titrating using a 0.01 mol/L benzyl alcohol solution of sodium hydroxide. A method for adjusting the amount of terminal carboxyl groups can be a conventional publicly known method, such as a method comprising adjusting polymerization conditions such as the charging ratios of raw materials when polymerizing, the polymerization temperature or the pressure reduction method, or a method comprising reacting a terminal-blocking agent.

Of these, the thermoplastic polyester resin (A) is preferably a resin that contains a polybutylene terephthalate resin, and it is preferable for 50 mass % or more of the thermoplastic polyester resin (A) to be a polybutylene terephthalate resin.

The polybutylene terephthalate resin can be produced by melt-polymerizing a dicarboxylic acid component containing terephthalic acid as a primary component or an ester derivative thereof, and a diol component containing 1,4-butane diol as a primary component in a batch or continuous melt polymerization. In addition, it is possible to increase the degree of polymerization (or molecular weight) to a desired value by producing a low molecular weight polybutylene terephthalate resin by means of melt polymerization and then carrying out solid state polymerization in a nitrogen stream or under reduced pressure.

The method for producing the polybutylene terephthalate resin is preferably a production method comprising subjecting a dicarboxylic acid component containing terephthalic acid as a primary component and a diol component containing 1,4-butane diol as a primary component to continuous melt polymerization.

A catalyst used for carrying out an esterification reaction may be a conventionally known catalyst. For example, it may be a titanium compound, a tin compound, a magnesium compound or a calcium compound. Of these, titanium compounds are particularly preferred. Specific examples of titanium compounds used as esterification catalysts include titanium alcoholates, such as tetramethyl titanate, tetraisopropyl titanate and tetrabutyl titanate; and titanium phenolates such as tetraphenyl titanate.

The polybutylene terephthalate resin may be a polybutylene terephthalate resin that is modified by means of copolymerization (hereinafter also referred to as a "modified polybutylene terephthalate resin"), but preferred specific examples of such copolymers include polyester-ether resins obtained by copolymerizing with a polyalkylene glycol (and especially polytetramethylene glycol), polybutylene terephthalate resins copolymerized with dimer acids, and polybutylene terephthalate resins copolymerized with isophthalic acid.

In cases where a polyester-ether resin obtained by copolymerizing with polytetramethylene glycol is used as the modified polybutylene terephthalate resin, the proportion of the tetramethylene glycol component in the copolymer is preferably 3 to 40 mass %, more preferably 5 to 30 mass %, and further preferably 10 to 25 mass %.

In cases where a polybutylene terephthalate resin copolymerized with a dimer acid is used as the modified polybutylene terephthalate resin, the proportion of the dimer acid component relative to all carboxylic acid components is preferably 0.5 to 30 mol. %, more preferably 1 to 20 mol. %, and further preferably 3 to 15 mol. %, in terms of carboxylic acid groups.

In cases where a polybutylene terephthalate resin copolymerized with isophthalic acid is used as the modified polybutylene terephthalate resin, the proportion of the isophthalic acid component relative to all carboxylic acid components is preferably 1 to 30 mol. %, more preferably 1 to 20 mol. %, and further preferably 3 to 15 mol. %, in terms of carboxylic acid groups.

Of these modified polybutylene terephthalate resins, polyester-ether resins obtained by copolymerizing with polytetramethylene glycol and polybutylene terephthalate resins copolymerized with isophthalic acid are preferred.

The intrinsic viscosity of the polybutylene terephthalate resin is preferably 0.5 to 2 dl/g. From the perspectives of moldability and mechanical properties, it is more preferable for the intrinsic viscosity to fall within the range 0.6 to 1.5 dl/g. If a resin having an intrinsic viscosity of less than 0.5 dl/g is used, the obtained resin composition tends to have low mechanical strength. If a resin having an intrinsic viscosity of more than 2 dl/g is used, the fluidity and moldability of the resin composition may deteriorate.

The amount of terminal carboxyl groups in the polybutylene terephthalate resin can be selected and decided as appropriate, but is generally 60 eq/ton or less, preferably 50 eq/ton or less, more preferably 40 eq/ton or less, and further preferably 30 eq/ton or less. If this amount exceeds 50 eq/ton, gas is readily generated during melt-processing the resin composition. The lower limit for the amount of terminal hydroxyl groups is not particularly limited, but is generally 10 eq/ton in view of productivity in production of the polybutylene terephthalate resin.

The amount of terminal carboxyl groups in the polybutylene terephthalate resin is a value obtained by dissolving 0.5 g of polyalkylene terephthalate resin in 25 mL of benzyl alcohol, and titrating using a 0.01 mol/L benzyl alcohol solution of sodium hydroxide. A method for adjusting the amount of terminal carboxyl groups may be a conventional publicly known method, such as a method comprising adjusting polymerization conditions such as the charging ratios of raw materials when polymerizing, the polymerization temperature or the pressure reduction method, or a method comprising reacting a terminal-blocking agent.

The thermoplastic polyester resin (A) preferably contains a polybutylene terephthalate homopolymer and the modified polybutylene terephthalate resin. Incorporating a specific quantity of a modified polybutylene terephthalate resin is preferable from the perspective of improving weld strength.

In cases where a polybutylene terephthalate homopolymer and a modified polybutylene terephthalate resin are contained, the content of the modified polybutylene terephthalate resin is preferably 5 to 50 masse, more preferably 10 to 40 mass %, and further preferably 15 to 30 mass %, relative to a total of 100 mass % of the polybutylene terephthalate homopolymer and modified polybutylene terephthalate resin.

Furthermore, the thermoplastic polyester resin (A) preferably contains a polybutylene terephthalate resin and a polyethylene terephthalate resin.

In cases where a polybutylene terephthalate resin and a polyethylene terephthalate resin are contained, the content of the polyethylene terephthalate resin is preferably 5 to 50 mass %, more preferably 10 to 45 mass %, and further preferably 15 to 40 mass %, relative to a total of 100 mass % of the polybutylene terephthalate resin and polyethylene terephthalate resin.

The polyethylene terephthalate resin is a resin having, as primary constituent units, oxyethyleneoxyterephthaloyl units comprising terephthalic acid and ethylene glycol as all constituent repeating units, and may contain constituent repeating units other than oxyethyleneoxyterephthaloyl units. The polyethylene terephthalate resin is produced using terephthalic acid or a lower alkyl ester thereof and ethylene glycol as primary raw materials. Other acid components and/or other glycol components may be additionally used as raw materials.

Examples of acid components other than terephthalic acid include dicarboxylic acids and derivatives thereof, such as phthalic acid, isophthalic acid, naphthalenedicarboxylic acid, 4,4'-diphenylsulfonedicarboxylic acid, 4,4'-biphenyldicarboxylic acid, 1,4-cyclohexanedicarboxylic acid, 1,3-phenylenedioxydiacetic acid and structural isomers thereof, malonic acid, succinic acid and adipic acid; and oxyacids and derivatives thereof, such as p-hydroxybenzoic acid and glycolic acid.

Examples of diol components other than ethylene glycol include aliphatic glycols such as 1,2-propane diol, 1,3-propane diol, 1,4-butane diol, pentamethylene glycol, hexamethylene glycol and neopentyl glycol; alicyclic glycols such as cyclohexanedimethanol; and aromatic dihydroxy compound derivatives such as bisphenol A and bisphenol S.

The polyethylene terephthalate resin may be obtained by copolymerizing 1.0 mol. % or less, preferably 0.5 mol. % or less, and more preferably 0.3 mol. % or less, of a branched component, for example a trifunctional component such as tricarballylic acid, trimelissic acid or trimellitic acid; a tetrafunctional acid having ester-forming capacity, such as pyromellitic acid; or a trifunctional or tetrafunctional alcohol having ester-forming capacity, such as glycerin, trimethylolpropane or pentaerythritol.

The intrinsic viscosity of the polyethylene terephthalate resin is preferably 0.3 to 1.5 dl/g, more preferably 0.3 to 1.2 dl/g, and particularly preferably 0.4 to 0.8 dl/g.

The concentration of terminal carboxyl groups in the polyethylene terephthalate resin is 3 to 50 eq/ton, preferably 5 to 40 eq/ton, and more preferably 10 to 30 eq/ton.

The concentration of terminal carboxyl groups in the polyethylene terephthalate resin is a value obtained by dissolving 0.5 g of polyethylene terephthalate resin in 25 mL of benzyl alcohol, and titrating using a 0.01 mol/L benzyl alcohol solution of sodium hydroxide.

A method for adjusting the amount of terminal carboxyl groups can be a conventional publicly known method, such as a method comprising adjusting polymerization conditions such as the charging ratios of raw materials when polymerizing, the polymerization temperature or the pressure reduction method, or a method comprising reacting a terminal-blocking agent.

[Brominated Polyacrylate Flame Retardant (B)]

The polyester resin composition of the present invention contains a brominated polyacrylate flame retardant (B) as a flame retardant. The brominated polyacrylate flame retardant (B) is preferably a polymer obtained by polymerizing a bromine atom-containing acrylate monomer, and especially benzyl (meth)acrylate, in isolation, copolymerizing two or more such monomers or copolymerizing such a monomer with another vinyl monomer, bromine atoms are added to a benzene ring, and the number of added bromine atoms is 1 to 5, and preferably 4 to 5, per benzene ring.

Examples of bromine atom-containing benzyl acrylates include pentabromobenzyl acrylate, tetrabromobenzyl acrylate, tribromobenzyl acrylate and mixtures of these. In addition, examples of bromine atom-containing benzyl methacrylates include methacrylates corresponding to the acrylates mentioned above.

Specific examples of other vinyl monomers used for copolymerization with the bromine atom-containing benzyl (meth)acrylate include acrylic acid; acrylic acid esters such as methyl acrylate, ethyl acrylate, butyl acrylate and benzyl acrylate; methacrylic acid; methacrylic acid esters such as methyl methacrylate, ethyl methacrylate, butyl methacrylate and benzyl methacrylate; styrene, acrylonitrile, unsaturated carboxylic acids, such as fumaric acid and maleic acid, and anhydrides thereof; and vinyl acetate and vinyl chloride.

The other vinyl monomer used for copolymerization is generally used at an equimolar quantity or less relative to the bromine atom-containing benzyl (meth)acrylate, and preferably at a quantity corresponding to 0.5 times or less of this molar quantity.

In addition, xylene diacrylate, xylene dimethacrylate, tetrabromoxylene diacrylate, tetrabromoxylene dimethacrylate, butadiene, isoprene, divinylbenzene, and the like, can be used as the other vinyl monomer, and these can generally be used at a quantity corresponding to 0.5 times or less of the molar quantity relative to the bromine atom-containing benzyl acrylate or benzyl methacrylate.

From the perspective of electrical insulation properties (tracking resistance properties), pentabromobenzyl polyacrylate is preferred as the brominated polyacrylate flame retardant (B) due to having a high bromine content.

In the present invention, a compound having a Na element concentration of 5 to 4000 ppm, as measured by X-Ray fluorescence analysis, is used as the brominated polyacrylate flame retardant (B). If the Na element concentration is less than 5 ppm, the laser markability of a molded body obtained from the polyester resin composition deteriorates, and if the Na element concentration exceeds 4000 ppm, the melt thermal stability of the resin is poor when the polyester composition is produced and viscosity retention properties deteriorate.

The lower limit for the Na element concentration is preferably 10 ppm, more preferably 30 ppm, and further preferably 50 ppm, and of these, 100 ppm, and especially 500 ppm, is preferred. The upper limit is preferably 3500 ppm, more preferably 3000 ppm, and further preferably 2500 ppm, and of these, 2000 ppm, and especially 1500 ppm, is preferred, and 1000 ppm is most preferred.

The Na element concentration in the brominated polyacrylate flame retardant (B) is measured by X-Ray fluorescence analysis. Moreover, in cases where the Na element concentration is low and cannot be detected by X-Ray fluorescence analysis, the Na element concentration is measured by means of ICP emission spectral analysis, which is an emission spectral analysis method that uses high-frequency inductively coupled plasma (ICP) as a light source.

A brominated flame retardant having a Na element concentration of 5 to 4000 ppm can be advantageously produced by washing the brominated polyacrylate flame retardant (B) with hot water having a temperature of 40° C. to 100° C.

If an explanation of a preferred method for producing the brominated polyacrylate flame retardant (B) used in the present invention is given by using pentabromobenzyl polyacrylate (hereinafter also referred to as PBBPA) as an example of a bromineated flame retardant, the PBBPA used in the present invention is preferably produced using a method comprising steps 1 to 4 below.

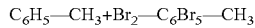  Step 1:

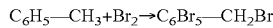  Step 2:

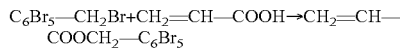  Step 3:

  Step 4:

By using this production method, PBBPA having a high bromine concentration can be obtained at a high yield. The obtained PBBPA is then washed with water. In step 3, HBr, NaOH, anhydrous sodium carbonate, and the like, are added, and Na therefore remains in the obtained PBBPA.

The water washing preferably comprises washing with hot water having a temperature of 40° C. to 100° C., and by drying after the water washing, it is possible to obtain PBBPA having a Na element concentration of 5 to 4000 ppm. Washing with methanol instead of water is not preferred from the perspective of difficulty in regulating the Na element concentration within the range mentioned above. The temperature of the water used for the water washing is preferably 60° C. to 100° C., and more preferably 85° C. to 100° C.

It is preferable for the brominated polyacrylate flame retardant (B) to have a Mg ion concentration of 5 to 2000 ppm, as measured by ICP emission spectral analysis, which is an emission spectral analysis method that uses high-frequency inductively coupled plasma (ICP) as a light source. In addition, it is preferable for the Al ion concentration to be 5 to 3000 ppm. If the Mg ion concentration falls within such a range, the residual heat stability of a PBT resin composition is good. In addition, if the Al ion concentration falls within the range mentioned above, molding processing properties are good.

It is preferable for the brominated polyacrylate flame retardant (B) to have a ratio (Mw/Mn) of mass average molecular weight (Mw) to number average molecular weight (Mn), as measured by gel permeation chromatography (GPC), of 5.5 or less. By using a flame retardant having a Mw/Mn ratio of 5.5 or lower, it becomes easier to obtain a resin composition which exhibits excellent flame retardancy, generates little gas during molding, causes less mold contamination and exhibits excellent melt thermal stability and laser markability. The reason for this is not yet clear, but it is thought that by having a narrow molecular weight distribution at which the Mw/Mn ratio is 5.5 or less, the content of low molecular weight components, which are a cause of gas generation, is low. The Mw/Mn ratio is more preferably 5.0 or less, and further preferably 4.5 or less, and is more preferably 3.0 or more.

It is preferable for the mass average molecular weight (Mw) of the brominated polyacrylate flame retardant (B) to be high from the perspective of reducing the quantity of corrosive gases generated. Specifically, the mass average molecular weight is preferably 10,000 or more, more preferably 15,000 or more, and further preferably 20,000 or more. The mass average molecular weight (Mw) does not have an upper limit, but because it is thought that melt dispersion cannot be adequately achieved if the mass average molecular weight (Mw) is too high, a somewhat low mass average molecular weight is preferred, and the mass average molecular weight is, specifically, preferably 200,000 or less, more preferably 100,000 or less, and further preferably 50,000 or less.

Like the mass average molecular weight (Mw), it is preferable for the number average molecular weight (Mn) to be high from the perspective of reducing the quantity of corrosive gases generated. Specifically, the number average molecular weight is preferably 3000 or more, more preferably 4500 or more, and further preferably 6000 or more. The number average molecular weight (Mn) does not have an upper limit, but because it is thought that melt dispersion cannot be adequately achieved if the number average molecular weight (Mn), like the mass average molecular weight (Mw), is too high, a somewhat low number average molecular weight is preferred, and the number average molecular weight is, specifically, preferably 30,000 or less, more preferably 20,000 or less, and further preferably 10,000 or less.

It is preferable for the molecular weight distribution of the brominated polyacrylate flame retardant (B) to have a single peak. FIG. 1 is a GPC chart of pentabromobenzyl polyacrylate, which is used in the examples and comparative examples, but it is preferable for the molecular weight distribution curve to have a single peak, such as PBBPA 9 and PBBPA 2 used in the examples given below, and a molecular weight distribution curve having a double peak, such as PBBPA 4 used in the comparative examples, is not preferred. Furthermore, it is more preferable for the molecular weight distribution of the brominated polyacrylate flame retardant (B) to have a single peak and for the position of the peak maximum to fall within the molecular weight range 20,000 to 50,000.

A variety of publicly known methods can be used to set the molecular weight distribution Mw/Mn of the brominated polyacrylate flame retardant (B) to be 5.5 or less and have a single peak, but examples of such methods include a method of adjusting the stirring speed when polymerizing a raw material brominated acrylate monomer using dicumyl peroxide and the like as a polymerization initiator, a method of carrying out anionic polymerization using an alkyl lithium polymerization initiator, and a method of carrying out polymerization using a Grignard reagent such as an alkyl magnesium bromide as a polymerization initiator.

In addition, it is possible to appropriately select and use a material that satisfies conditions stipulated in the present invention from among commercially available materials.

Relative to 100 parts by mass of the thermoplastic polyester resin (A), the content of the brominated polyacrylate flame retardant (B) is 3 to 60 parts by mass, and is preferably 5 parts by mass or more, more preferably 8 parts by mass or more, and further preferably 10 parts by mass or more, and is preferably 50 parts by mass or less, more preferably 40 parts by mass or less, and further preferably 30 parts by mass or less. If this content is less than 3 parts by mass, flame retardancy tends to deteriorate and laser markability deteriorates. Conversely, if this content exceeds 60 parts by mass, the quantity of gas generated increases, mold contamination and contact point contamination can occur, the melt thermal stability of the resin deteriorates when a polyester composition is produced, and viscosity retention properties deteriorate.

[Phosphate Stabilizer (C)]

It is preferable for the resin composition of the present invention to contain a stabilizer.

Stabilizers for polyester resins include a variety of types, such as phosphorus stabilizers, phenolic stabilizers and sulfur-type stabilizers, but phosphite stabilizers and the like tend to be insufficient in terms of effect despite being phosphorus stabilizers, and the polyester resin composition of the present invention preferably contains a phosphate stabilizer or phenolic stabilizer, with a phosphate stabilizer being particularly preferred.

Organic phosphate compounds represented by general formula (1) below and metal salts thereof are preferred as the phosphate stabilizer (C).

$$O=P(OH)_n(OR^1)_{3-n} \quad (1)$$

(In general formula (1), $R^1$ is an alkyl group or an aryl group. n denotes an integer between 0 and 2. In cases where n is 0, the three $R^1$ groups may be the same or different from each other, and in cases where n is 1, the two $R^1$ groups may be the same different from each other.)

As metal salts, Zn salts, Al salts, Mg salts, Ca salts, and the like, are preferred, Zn salts and Al salts are preferred, and Zn salts are preferred.

In general formula (1) above, $R^1$ denotes an alkyl group or an aryl group, but $R^1$ is more preferably an alkyl group that has one or more, and preferably 2 or more carbon atoms, and generally 30 or fewer, and preferably 25 or fewer carbon atoms, or an aryl group that has 6 or more, and generally 30 or fewer, carbon atoms. $R^1$ is preferably an alkyl group rather than an aryl group. In cases where two or more $R^1$ groups are present, the $R^1$ groups may be the same as, or different from, each other.

A more preferred organic phosphate compound represented by general formula (1) is a long chain alkyl acid phosphate compound in which $R^1$ has 8 to 30 carbon atoms. Specific examples of alkyl groups having 8 to 30 carbon atoms include octyl groups, 2-ethylhexyl groups, isooctyl groups, nonyl groups, isononyl groups, decyl groups, isodecyl groups, dodecyl groups, tridecyl groups, isotridecyl groups, tetradecyl groups, hexadecyl groups, octadecyl groups, eicosyl groups and triacontyl groups.

Examples of long chain alkyl acid phosphates include octyl acid phosphate, 2-ethylhexyl acid phosphate, decyl acid phosphate, lauryl acid phosphate, octadecyl acid phosphate, oleyl acid phosphate, behenyl acid phosphate, phenyl acid phosphate, nonylphenyl acid phosphate, cyclohexyl acid phosphate, phenoxyethyl acid phosphate, alkoxy polyethylene glycol acid phosphates, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dioctyl acid phosphate, dilauryl acid phosphate, distearyl acid phosphate, diphenyl acid phosphate and bis (nonylphenyl) acid phosphate.

In addition, metal salts of these long chain alkyl acid phosphates can also be given as examples, with Zn salts and Al salts being particularly preferred.

Of these, octadecyl acid phosphate is preferred, and the product "ADK STAB AX-71" manufactured by ADEKA Corporation is commercially available as this compound. In addition, a zinc salt of octadecyl acid phosphate is also preferred, and this is commercially available as the product "JP-518Zn" manufactured by Johoku Chemical Co., Ltd.

It is possible to incorporate a single phosphate stabilizer (C) or a combination of two or more arbitrary types thereof combined at arbitrary proportions.

The content of the phosphate stabilizer (C) is preferably 0.01 to 1.5 parts by mass, more preferably 0.01 to 1 part by mass, and further preferably 0.05 to 0.8 parts by mass, relative to 100 parts by mass of the thermoplastic polyester resin (A).

[Phenolic Stabilizer]

Examples of phenolic stabilizers include preferably a hindered phenolic stabilizer such as pentaerythritol tetrakis [3-(3,5-di-tert-butyl-4-hydroxyphenyl) propionate], octadecyl-3-(3,5-di-tert-butyl-4-hydroxyphenyl) propionate, thiodiethylene-bis[3-(3,5-di-tert-butyl-4-hydroxyphenyl) propionate], N,N'-hexane-1,6-diyl-bis[3-(3,5-di-tert-butyl-4-hydroxyphenyl) propionamide], 2,4-dimethyl-6-(1-methylpentadecyl)phenol, diethyl[[3,5-bis(1,1-dimethylethyl)-4-hydroxyphenyl]methyl]phosphonate, 3,3',3'',5,5',5''-hexatert-butyl-a,a',a''-(mesitylene-2,4,6-triyl)tri-p-cresol, 4,6-bis(octylthiomethyl)-o-cresol, ethylene-bis(oxyethylene)-bis [3-(5-tert-butyl-4-hydroxy-m-tolyl) propionate], hexamethylene-bis[3-(3,5-di-tert-butyl-4-hydroxyphenyl) propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazine-2-ylamino)phenol, 2-[1-(2-hydroxy-3,5-di-tert-pentylphenyl)ethyl]-4,6-di-tertpentylphenyl acrylate.

Of these, pentaerythritol tetrakis[3-(3,5-di-tert-butyl-4-hydroxyphenyl) propionate], octadecyl-3-(3,5-di-tert-butyl-4-hydroxyphenyl) propionate and pentaerythritol-tetrakis-(β-lauryl-thiopropionate) are preferred. Specific examples of this type of phenolic antioxidant include the products "Irganox 1010" and "Irganox 1076" manufactured by BASF SE and the products "ADK STAB AO-50", "ADK STAB AO-60" and "ADK STAB AO-4125" manufactured by ADEKA Corporation.

It is possible to incorporate a single hindered phenolic stabilizer or a combination of two or more arbitrary types thereof combined at arbitrary proportions.

The content of the phenolic stabilizer is preferably 0.01 to 1 part by mass relative to 100 parts by mass of the thermoplastic polyester resin (A). If this content is less than 0.01 parts by mass, thermal stability tends to deteriorate. If this content exceeds 1 part by mass, the amount of gas generated may increase. This content is more preferably 0.05 to 0.8 parts by mass, and further preferably 0.1 to 0.6 parts by mass.

In the present invention, using a combination of a phosphorus stabilizer represented by general formula (1) above and a phenolic stabilizer is preferable from the perspectives of heat residence stability and heat resistance.

[Antimony Compound]

It is preferable for the resin composition of the present invention to contain an antimony compound as an auxiliary flame retardant.

Examples of antimony compounds include antimony trioxide ($Sb_2O_3$), antimony pentoxide ($Sb_2O_5$) and sodium antimonate. Antimony trioxide is particularly preferred.

Relative to 100 parts by mass of the thermoplastic polyester resin (A), the content of the antimony compound is preferably 0.5 to 20 parts by mass, more preferably 0.7 to 18 parts by mass, further preferably 1 to 15 parts by mass, particularly preferably 2 to 13 parts by mass, and most preferably 3 to 10 parts by mass.

The total concentration by mass of bromine atoms derived from the brominated polyacrylate flame retardant (B) and antimony atoms derived from the antimony compound in the resin composition of the present invention is generally 3 to 25 mass %, preferably 4 to 22 mass %, more preferably 5 to 16 mass %, and further preferably 6 to 15 mass %. If this overall mass concentration is less than 3 mass %, flame retardancy tends to deteriorate, and if this overall mass concentration exceeds 25 mass %, mechanical strength and tracking resistance may deteriorate. In addition, the mass ratio of bromine atoms and antimony atoms (Br/Sb) is preferably 0.3 to 5, and more preferably 0.3 to 4.

[Metal Borate]

It is preferable for the resin composition of the present invention to contain a metal borate, and the content of the metal borate is preferably 0.3 to 10 parts by mass relative to 100 parts by mass of the thermoplastic polyester resin (A). In addition, it is preferable for the mass ratio of (i) antimony trioxide and (ii) a metal borate (i/ii) to fall within the range 1 to 20. By incorporating a metal borate at such a quantity and mass ratio, it is possible to improve feedability when melt kneading, dispersibility in the resin composition and combustibility, and excellent laser markability is also achieved. This (i)/(ii) ratio is preferably 2 to 18, and more preferably 4 to 16.

The borate that forms the metal borate is preferably a non-condensed borate such as an orthoborate or metaborate; a condensed borate such as a pyroborate, a tetraborate, a pentaborate or an octaborate; or a basic borate, etc. The metal that forms a salt with these borates may be an alkali metal, but of these, polyvalent metals such as alkaline earth metals, transition metals and metals belonging to group 2B of the periodic table are preferred. In addition, the metal borate is preferably a hydrate.

Metal borates include non-condensed metal borates, condensed metal borates and basic metal borates, and examples of non-condensed metal borates include alkaline earth metal borates such as calcium orthoborate and calcium metaborate; transition metal borates such as manganese orthoborate and copper metaborate; and borates of metals belonging to group 2B of the periodic table, such as zinc metaborate and cadmium metaborate. Of these, metaborates are preferred.

Examples of condensed metal borates include alkaline earth metal borates such as trimagnesium tetraborate and calcium pyroborate; transition metal borates such as manganese tetraborate and nickel diborate; and borates of metals belonging to group 2B of the periodic table, such as zinc tetraborate and cadmium tetraborate.

Examples of basic metal borates include borates of metals belonging to group 2B of the periodic table, such as basic zinc borate and basic cadmium borate. In addition, it is possible to use hydrogen borates corresponding to these borates (for example, manganese hydrogen orthoborate).

The metal borate used in the present invention is preferably a salt of an alkaline earth metal or a metal belonging to group 2B of the periodic table, such as a zinc borate or calcium borate. Zinc borates include zinc borate ($2ZnO.3B_2O_3$) and zinc borate.3.5 hydrate ($2ZnO.3B_2O_3.3.5H_2O$), and the like, and calcium borates include anhydrous calcium borate ($2CaO.3B_2O_3$), and the like. The calcium borate may be colemanite (which is an inorganic compound comprising mainly calcium borate and is generally a hydrate represented by the chemical formula $2CaO.3B_2O_3.5H_2O$).

Of these zinc borates and calcium borates, hydrates are preferred. Of these, zinc borates are preferred.

Of the borates mentioned above, a metal borate in which the content of an alkali metal and/or alkaline earth metal in the metal borate is 2000 ppm by mass or less is preferred from the perspective of residual heat stability. Examples of alkali metals and alkaline earth metals include K, Na, Ca and Mg, but of these, a metal borate in which the content of K and/or Ca is 2000 ppm by mass or less is preferred, and more preferably 1500 ppm by mass or less, further preferably 1000 ppm by mass or less, and 800 ppm by mass or less is particularly preferred.

The content of an alkali metal and/or alkaline earth metal in the metal borate can be measured by X-Ray fluorescence analysis.

In addition, the average particle diameter of the metal borate used when producing the polyester resin composition is preferably 4 μm or more, more preferably 6 μm or more, and further preferably 8 μm or more. The upper limit for the average particle diameter is preferably 30 μm, more preferably 20 μm, and further preferably 15 μm. If the average particle diameter of the metal borate is less than 4 μm, feedability during melt kneading deteriorates, the dispersed state of an obtained resin composition tends to deteriorate, and combustibility tends to deteriorate. If the average particle diameter exceeds 30 μm, mechanical properties deteriorate and surface appearance may significantly deteriorate causing an unfavorable result.

The average particle diameter of the metal borate means the median diameter (D50), as measured using a laser diffraction method.

Furthermore, the metal borate may be surface treated using a surface treatment agent such as a silane coupling agent. Any conventional publicly known surface treatment agent can be used, and specific examples of silane coupling agents include aminosilane-type, epoxysilane-type, allylsilane-type and vinylsilane-type surface treatment agents.

Of these, aminosilane-type surface treatment agents are preferred. Preferred specific examples of aminosilane-type coupling agents include γ-aminopropyltriethoxysilane, γ-aminopropyltrimethoxysilane and γ-(2-aminoethyl)aminopropyltrimethoxysilane.

As long as the advantageous effect of the present invention is not impaired, the surface treatment agent for the metal borate may be one obtained by incorporating other components, specific examples such as epoxy resins, urethane resins, acrylic resins, anti-static agents, lubricants and water-repelling agents, in a surface treatment agent such as the silane coupling agents mentioned above.

A surface treatment method involving this type of surface treatment agent can be carrying out a surface treatment in advance using a surface treatment agent, or carrying out a surface treatment by adding a surface treatment agent separately from an untreated metal borate when preparing the resin composition of the present invention.

The content of the metal borate is, relative to 100 parts by mass of a polybutylene terephthalate resin (A), preferably 0.3 to 10 parts by mass, and more preferably 0.5 parts by mass or more, and is more preferably 7 parts by mass or less, and further preferably 5 parts by mass or less.

[Release Agent]

It is preferable for the resin composition of the present invention to further contain a release agent. Release agents that are known and commonly used for thermoplastic polyester resins may be utilized as the release agent. Of these, at least one type of release agent selected from among polyolefin compounds, fatty acid ester compounds and silicone compounds is preferred.

Examples of polyolefin compounds include compounds selected from among paraffin waxes and polyethylene waxes, and of these, compounds having mass average molecular weights of 700 to 10,000, and especially 900 to 8000, are preferred. In addition, modified polyolefin compounds obtained by introducing hydroxyl groups, carboxyl groups, acid anhydride groups, epoxy groups, or the like, into side chains are particularly preferred.

Examples of fatty acid ester compounds include fatty acid esters, such as glycerol fatty acid esters, sorbitan fatty acid esters and pentaerythritol fatty acid esters, and partially saponified products thereof. Of these, mono- and di-fatty acid esters constituted from fatty acids having 11 to 28 carbon atoms, and preferably 17 to 21 carbon atoms, are preferred. Specific examples thereof include glycerol monostearate, glycerol monobehenate, glycerol dibehenate, glycerol-12-hydroxymonostearate, sorbitan monobehenate, pentaerythritol distearate and pentaerythritol tetrastearate.

A modified compound is preferred as the silicone compound from perspectives such as compatibility with the thermoplastic polyester resin (A). Examples of modified silicone oils include silicone oils obtained by introducing organic groups into side chains of polysiloxanes and silicone oils obtained by introducing organic groups at one or both terminals of polysiloxanes. Examples of organic groups to be introduced into the silicone compound include epoxy groups, amino groups, carboxyl groups, carbinol groups, methacrylic groups, mercapto groups and phenol groups, and epoxy groups are preferred. A silicone oil obtained by introducing epoxy groups into side chains of a polysiloxane is particularly preferred as the modified silicone oil.

The content of the release agent is preferably 0.05 to 2 parts by mass relative to 100 parts by mass of the thermoplastic polyester resin (A). If this content is less than 0.05 parts by mass, surface properties tend to deteriorate as a result of release defects during melt processing, but if this content exceeds 2 parts by mass, the kneading workability of the resin composition may deteriorate and the surface of a molded article may become foggy. The content of the release agent is preferably 0.1 to 1.5 parts by mass, and more preferably 0.3 to 1.0 parts by mass.

[Lubricant]

It is preferable for the resin composition of the present invention to contain a lubricant. Examples of lubricants include paraffins such as paraffin oils and solid paraffins, higher fatty acids such as stearic acid, higher alcohols such as palmityl alcohol and stearyl alcohol, fatty acid metal salts such as calcium stearate, zinc stearate, barium stearate, aluminum stearate and magnesium stearate, fatty acid esters such as butyl stearate, glycerol monostearate and diethylene glycol monostearate, fatty acid amides such as stearoamide, methylene-bisstearoamide, ethylene-bisstearoamide, oxystearic acid ethylene diamide, methylolamide, oleylamide, stearamide and erucic acid amide, and waxes such as carnauba wax and montan wax. Of these, calcium stearate is particularly preferred.

The content of the lubricant is preferably 0.01 to 2 parts by mass, and more preferably 0.05 to 0.5 parts by mass relative to 100 parts by mass of the thermoplastic polyester resin (A).

[Other Contained Components]

The resin composition of the present invention may contain a variety of additives other than those mentioned above as long as the advantageous effect of the present invention is not significantly impaired. Examples of such additives include flame retardants other than the brominated polyacrylate flame retardant (B), auxiliary flame retardants other than antimony compounds, ultraviolet radiation absorbers, fillers, anti-static agents, anti-fogging agents, pigments, dyes, fluorescent whitening agents, anti-blocking agents, fluidity improving agents, plasticizers, dispersing agents and antimicrobial agents. It is possible to use a combination of two or more types of these.

Examples of flame retardants other than the brominated polyacrylate flame retardant (B) include brominated polycarbonates, brominated epoxy compounds, brominated polystyrenes and brominated polyphenylene ethers.

In addition, the polyester resin composition of the present invention may contain a thermoplastic resin other than the thermoplastic polyester resin (A) as long as the advantageous effect of the present invention is not significantly impaired. Specific examples of other thermoplastic resins include polyamide resins, polycarbonate resins, polyphenylene oxide resins, polyacetal resins, styrene resins (including ABS resins and the like), polyphenylene sulfide-ethylene resins, polysulfone resins, polyethersulfone resins, polyetherimide resins, polyetherketone resins and polyolefin resins. In addition, it is preferable for the resin composition of the present invention to contain any of a variety of elastomers in order to improve impact resistance.

[Production of Resin Composition]

The resin composition of the present invention is produced by mixing and melt kneading the components. Specifically, the resin composition can be produced by pre-mixing the thermoplastic polyester resin (A), the brominated polyacrylate flame retardant (B) and other components blended according to need in a mixing machine such as a tumbler or Henschel mixer, and then melt kneading in a Banbury mixer, a roller, a Brabender, a uniaxial kneading extruder, a biaxial kneading extruder, a kneader, or the like. It is preferable to wash the brominated polyacrylate flame retardant (B) with hot water having a temperature of 40° C. to 100° C., drying the washed product, and then mixing the dried product with the thermoplastic polyester resin (A).

It is also possible to produce the resin composition of the present invention without pre-mixing the components or by pre-mixing only some of the components, and then supplying to an extruder by means of a feeder and carrying out melt kneading.

It is also possible to produce the resin composition of the present invention by forming a master batch from the resin composition obtained by pre-mixing some of the components and supplying these premixed components to an extruder and melt kneading, then mixing this master batch with the remaining components and melt kneading.

In cases where a fibrous substance such as glass fibers is used as a filler, it is preferable to supply the filler from a side feeder located part of the way along the cylinder of the extruder.

As mentioned above, the second aspect of the polyester resin composition of the present invention comprises containing 3 to 60 parts by mass of a brominated polyacrylate flame retardant (B) relative to 100 parts by mass of a thermoplastic polyester resin (A), and the resin composition having a Na element concentration of 1 to 400 ppm, as measured by atomic absorption spectroscopy.

If the Na element concentration in the polyester resin composition is less than 1 ppm, the laser markability of a molded body obtained from the polyester resin composition deteriorates, and if the Na element concentration exceeds 400 ppm, the melt thermal stability of the resin is poor when the polyester composition is produced and viscosity retention properties deteriorate. It is surmised that this is generally caused by a phenomenon whereby hydrolysis of a polyester resin progresses in the presence of an alkali metal.

The upper limit of the Na element concentration is preferably 350 ppm, more preferably 300 ppm, and further preferably 250 ppm, and of these, 200 ppm, and especially 150 ppm, is preferred, and 100 ppm is most preferred.

The Na element concentration in the polyester resin composition is measured by atomic absorption spectroscopy.

The method for producing a molded resin article from the resin composition of the present invention is not particularly limited, and it is possible to use a molding method routinely used for thermoplastic polyester resins, that is, an ordinary injection molding method, an ultra high-speed injection molding method, an injection compression molding method, a two-color molding method or a gas assisted hollow molding method, a molding method involving use of a heat insulating mold, a molding method involving use of a rapidly heated mold, a foaming molding method (including supercritical fluids), an insert molding method, an IMC (in-mold coating) molding method, an extrusion molding method, a sheet molding method, a thermoforming method, a rotational molding method, a lamination molding method or a press molding method. In addition, it is possible to select a molding method involving the use of a hot runner method. Injection molding is particularly preferred.

The polyester resin composition of the present invention exhibits excellent flame retardancy and melt thermal stability and also exhibits excellent laser markability, and can therefore be used in a wide variety of applications, is particularly suitable for electrical devices, electronic devices and components thereof, and can be advantageously used in electrical/electronic equipment having contact points such as relays, switches, connectors, circuit breakers, electromagnetic switches, terminal switches, sensors, actuators, microswitches, microsensors and microactuators; and housings for electrical/electronic equipment.

EXAMPLES

The present invention will now be explained in greater detail through the use of examples. However, it should be understood that the present invention is not limited to the examples given below.

The components used in the examples and comparative examples below are as shown in Table 1 below.

TABLE 1

| Component | Simbol | |
|---|---|---|
| Polyester resin (A) | PBT 1 | Polybutylene terephthalate resin manufactured by Mitsubishi Engineering-Plastics Corporation product name: Novaduran (registered trademark) 5008, intrinsic viscosity 0.85 dl/g |
| | PBT 2 | Polybutylene terephthalate resin manufactured by Mitsubishi Engineering-Plastics Corporation product name: Novaduran (registered trademark) 5020, intrinsic viscosity 1.20 dl/g |
| | PBT 3 | Polybutylene terephthalate resin manufactured by Mitsubishi Engineering-Plastics Corporation product name: Novaduran (registered trademark) 5007, intrinsic viscosity 0.70 dl/g |
| Pentabromobenzyl polyacrylate (B) | PBBPA 1 | Water washing: 90° C. × 2 hours Mw = 33,000, Mn = 8700, Mw/Mn = 3.79, single peak bromine concentration 70 mass %, Na element concentration 900 ppm (X-Ray fluorescence analysis), Mg ion concentration 1300 ppm, Al ion concentration 800 ppm |
| | PBBPA 2 | Water washing: 90° C. × 1 hour Mw = 33,000, Mn = 8700, Mw/Mn = 3.79, single peak bromine concentration 70 mass %, Na element concentration 1500 ppm (X-Ray fluorescence analysis), Mg ion concentration 1500 ppm, Al ion concentration 1600 ppm |
| | PBBPA 3 | Methanol washing: 90° C. × 2 hours Mw = 33,000, Mn = 8700, Mw/Mn = 3.79, single peak bromine concentration 70 mass %, Na element concentration 4600 ppm (X-Ray fluorescence analysis), Mg ion concentration 1500 ppm, Al ion concentration 1200 ppm |
| | PBBPA 4 | Manufactured by ICL Co., Ltd., product name FR-1025 Mw = 31,000, Mn = 4,200, Mw/Mn = 7.38, double peak, peaks at 1500 and 44,700 bromine concentration 70 mass %, Na element concentration not detected (X-Ray fluorescence analysis), 4 ppm (ICP) Mg ion concentration: not detected (X-Ray fluorescence analysis), not detected (ICP) Al ion concentration: not detected (X-Ray fluorescence analysis), not detected (ICP) |
| | PBBPA 5 | Water washing: 90° C. × 20 minutes Mw = 33,000, Mn = 8700, Mw/Mn = 3.79, single peak bromine concentration 70 mass % Na element concentration 3600 ppm (X-Ray fluorescence analysis), Mg ion concentration 1400 ppm, Al ion concentration 1400 ppm |

TABLE 1-continued

| Component | | Simbol | |
|---|---|---|---|
| | | PBBPA 6 | Water washing: 90° C. × 2 hours × 5 times<br>Mw = 33,000, Mn = 8700, Mw/Mn = 3.79, single peak<br>bromine concentration 70 mass %<br>Na element concentration not detected (X-Ray fluorescence analysis), 32 ppm (ICP)<br>Mg ion concentration 1400 ppm, Al ion concentration 1400 ppm |
| | | PBBPA 7 | Water washing: 98° C. × 2 hours × 5 times<br>Mw = 33,000, Mn = 8700, Mw/Mn = 3.79, single peak<br>bromine concentration 70 mass %, Na element concentration 4 ppm (ICP)<br>Mg ion concentration 1100 ppm, Al ion concentration 1200 ppm |
| | Sb compound | | Antimony trioxide<br>product name: Fire Cut AT-3CN manufactured by Suzuhiro Chemical Co., Ltd. |
| Stabilizer | Stabilizer 1 | | Phenolic stabilizer<br>pentaerythritol-tetrakis-(b-lauryl-thiopropionate)<br>manufactured by ADEKA Corporation, product name: ADK STAB AO-412S |
| | Stabilizer 2 | | Phenolic stabilizer<br>pentaerythritol-tetrakis[3-(3,5-di-t-butyl-4-hydroxyphenyl)propionate,<br>manufactured by ADEKA Corporation name ADK STAB AO-60 |
| Release agent | Release agent 1 | | Paraffin-based wax<br>product name: HNP0190 manufactured by Nippon Seiro Co., Ltd. |
| | Release agent 2 | | Paraffin-based wax<br>product name: FT100 manufactured by Nippon Seiro Co., Ltd. |
| | Lubricant | | Calcium stearate<br>manufactured by NOF Corporation, product name Calcium Stearate S |
| | Reinforcing material | | Glass fiber, manufactured by Nippon Electric Glass Co., Ltd., product name T127,<br>average fiber diameter 13 mm, average fiber length 3 mm |

The pentabromobenzyl polyacrylates PBBPA 1 to 3 and 5 to 7 in Table 1 above were obtained by washing PBBPA, which was produced using steps 1 to 4 described previously, in the manner described in Table 1.

The Na element concentration in PBBPA 1 to 7 was measured by X-Ray fluorescence analysis, or in cases where Na element was not detected in X-Ray fluorescence analysis, it was measured by emission spectral analysis (ICP).

Mg ion concentration and Al ion concentration were measured by means of ICP emission spectral analysis.

The water used when washing PBBPA was, in all cases, prepared using a commercially available "Simpsicity UV" ultra-pure water production system manufactured by Nippon Millipore K. K. The water used for water washing in the following examples given below is also the same.

Examples 1 to 7 and Comparative Examples 1 to 9

Pellets were obtained by blending the components shown in Table 1 at the quantities (parts by mass in all cases) shown in Tables 2 to 3 below, kneading the components by using a twin screw extruder ("TEX30α" manufactured by Japan Steel Works, Ltd.) at an extruder barrel preset temperature of 260° C. and a screw rotation speed of 200 rpm so as to extrude in the form of a strand, rapidly cooling the strand in a water bath, and then forming pellets by a pelletizer. Calcium stearate as a lubricant was then externally added by dry blending to the obtained pellets at a quantity of 0.1 parts by mass relative to 100 parts by mass of polybutylene terephthalate resin so as to obtain resin composition pellets.

[Evaluation of Melt Thermal Stability]
(1) Measurement of Intrinsic Viscosity of Resin and Intrinsic Viscosity of Pellets The intrinsic viscosity IV at 30° C. of a raw material polybutylene phthalate resin prior to charging (a mixture having the mass ratio shown in Table 2) was measured (this is referred to as "charging IV"). Intrinsic viscosity is a value (units: dl/g) measured at 30° C. in a mixed solvent comprising tetrachloroethane and phenol at a mass ratio of 1:1.

Next, the intrinsic viscosity IV of the obtained resin composition pellets was measured (this is referred to as "pellet IV").

The percentage of pellet IV relative to charging IV ([pellet IV/charging IV]×100) was determined and deemed to be the intrinsic viscosity retention rate (units: %). It can be said that a higher intrinsic viscosity retention rate means lower resin decomposition.

(2) MVR of Pellets

After drying obtained resin composition pellets at 120° C. for 6 hours or longer, MVR (melt volume rate, units: $cm^3/10$ min) was measured in accordance with ISO 1133 at a measurement temperature of 250° C. under a load of 2.16 kgf. It can be said that a higher MVR value means that resin decomposition has progressed.

[Laser Markability]

Obtained resin composition pellets were injection molded into the flat-plate molded articles measuring 100 mm×100 mm×2 mm thick using an injection molding machine ("NEX80" manufactured by Nissei Plastic Industrial Co., Ltd.) at a cylinder temperature of 250° C. and a mold temperature of 80° C.

Using a "LP-Z130 laser marker" of SUNX Limited in a fiber lasar oscillation mode, laser marking was carried out so as to fill a 20 mm×20 mm square of a flat-plate molded article under the following conditions: Laser power: 100, Marking pulse cycle: 50 µs, Line width: 0.07 mm, Marking out interval: 0.035 mm, Number of over-marking times: once. When carrying out the laser marking, the scanning speed was 5000 mm/sec.

Laser markability was appraised by visually observing test pieces that had been subjected to laser marking, and was ranked as ○, Δ or X according to the following criteria.

○: Clear marking was formed and could be easily recognized.

Δ: Marking could be recognized.

X: Marking was not formed at all, or marking could not easily be recognized.

[Flame Retardancy]

Obtained resin composition pellets were injection molded into the form of combustion test pieces measuring 12.5 mm×125 mm×0.75 mm or 0.38 mm thick using an injection molding machine ("NEX80" manufactured by Nissei Plastic Industrial Co., Ltd.) at a cylinder temperature of 250° C. and a mold temperature of 80° C. Flame retardancy was evaluated in the following way.

Flame retardancy (UL94):

In accordance with the Underwriters Laboratories Subject 94 (UL94) method, flame retardancy was tested using five test pieces (thickness 0.75 mm or 0.38 mm), and classified as V-0, V-1, V-2 or NR (not rated).

[Silver Plate Corrosion]

50 g of obtained resin composition pellets were placed in a glass wide-mouthed flask having an internal capacity of 120 mL, a silver plate (measuring 10 mm×0.2 mmt) was placed on the resin composition pellets, and the flask was held for 250 hours in an oven at 160° C., after which the degree of yellowing of the surface of the silver plate was visually observed, and the degree of yellowing was evaluated according to the 3 levels below.

Level 1: No discoloration or almost no discoloration.
Level 2: Discoloration occurred, but only to a slight extent.
Level 3: Distinct discoloration.

[Na Element Concentration in Composition]

500 mg of resin composition was weighed out, subjected to wet decomposition by means of sulfuric acid/nitric acid, subjected to wet decomposition by means of sulfuric acid/hydrogen peroxide, and then filtered using a cartridge filter, after which the Na element concentration was measured by means of atomic absorption spectroscopy.

The evaluation results above are shown in Tables 2 to 3.

TABLE 2

| Component | | Example | | | | | | |
|---|---|---|---|---|---|---|---|---|
| | | 1 | 2 | 3 | 4 | 5 | 6 | 7 |
| PBT 1 | | 17.1 | 17.1 | 17.1 | 17.1 | | | |
| PBT 2 | | 82.9 | 82.9 | 82.9 | 82.9 | 25 | 25 | 25 |
| PBT 3 | | | | | | 75 | 75 | 75 |
| PBBPA 1 | | 12.4 | | | | 18.8 | | |
| PBBPA 2 | | | 12.4 | | | | 18.8 | |
| PBBPA 3 | | | | | | | | |
| PBBPA 4 | | | | | | | | |
| PBBPA 5 | | | | 12.4 | | | | 18.8 |
| PBBPA 6 | | | | | 12.4 | | | |
| PBBPA 7 | | | | | | | | |
| Sb compound | | 5.5 | 5.5 | 5.5 | 5.5 | 8.3 | 8.3 | 8.3 |
| Stabilizer 1 | | 0.2 | 0.2 | 0.2 | 0.2 | | | |
| Stabilizer 2 | | | | | | 0.6 | 0.6 | 0.6 |
| Release agent 1 | | 0.4 | 0.4 | 0.4 | 0.4 | | | |
| Release agent 2 | | | | | | 0.6 | 0.6 | 0.6 |
| Lubricant | | 0.1 | 0.1 | 0.1 | 0.1 | | | |
| Reinforcing material | | | | | | 54.4 | 54.4 | 54.4 |
| Flame retardancy | Rank | V-0 | V-0 | V-0 | V-0 | V-0 | V-0 | V-0 |
| | Evaluation thickness (mmt) | 0.75 | 0.75 | 0.75 | 0.75 | 0.38 | 0.38 | 0.38 |
| Intrinsic viscosity | Charging IV | 1.14 | 1.14 | 1.14 | 1.14 | 0.74 | 0.74 | 0.74 |
| | Pellet IV | 1.00 | 0.96 | 0.93 | 1.02 | 0.64 | 0.62 | 0.67 |
| | Intrinsic viscosity retention rate (%) | 88 | 84 | 82 | 89 | 86 | 84 | 90 |
| MVR (cm$^3$/10 min) | | 28 | 33 | 37 | 37 | 37 | 37 | 37 |
| Laser markability | | ○ | ○ | ○ | ○ | ○ | ○ | ○ |
| Silver plate corrosion (Level 1-3) | | LV2 | LV2 | LV2 | LV2 | LV2 | LV2 | LV2 |
| Na element concentration (ppm) | | 102 | 162 | 392 | 3 | Not carried out | Not carried out | Not carried out |

TABLE 3

| Component | Comparative Example | | | | | | | | |
|---|---|---|---|---|---|---|---|---|---|
| | 1 | 2 | 3 | 4 | 5 | 6 | 7 | 8 | 9 |
| PBT 1 | 17.1 | 17.1 | 17.1 | 17.1 | 17.1 | | | | |
| PBT 2 | 82.9 | 82.9 | 82.9 | 82.9 | 82.9 | 25 | 25 | 25 | 25 |
| PBT 3 | | | | | | 75 | 75 | 75 | 75 |
| PBBPA 1 | | | | 70 | | | | | 100 |
| PBBPA 2 | | | | | | | | | |
| PBBPA 3 | | | 12.4 | | | | | 18.8 | |
| PBBPA 4 | 12.4 | | | | | 18.8 | | | |
| PBBPA 5 | | | | | | | | | |
| PBBPA 6 | | | | | | | | | |
| PBBPA 7 | | | | | 12.4 | | | | |
| Sb compound | 5.5 | 5.5 | 5.5 | 5.5 | 5.5 | 5.5 | 5.5 | 5.5 | 5.5 |
| Stabilizer 1 | 0.2 | 0.2 | 0.2 | 0.2 | 0.2 | | | | |
| Stabilizer 2 | | | | | | 0.6 | 0.6 | 0.6 | 0.6 |
| Release agent 1 | 0.4 | 0.4 | 0.4 | 0.4 | 0.4 | | | | |
| Release agent 2 | | | | | | 0.6 | 0.6 | 0.6 | 0.6 |

TABLE 3-continued

| | | Comparative Example | | | | | | | | |
|---|---|---|---|---|---|---|---|---|---|---|
| Component | | 1 | 2 | 3 | 4 | 5 | 6 | 7 | 8 | 9 |
| Lubricant | | 0.1 | 0.1 | 0.1 | 0.1 | 0.1 | | | | |
| Reinforcing material | | | | | | | 54.4 | 54.4 | 54.4 | 54.4 |
| Flame retardancy | Rank | V-0 | V-0 | Not rated | V-0 | V-0 | V-0 | V-0 | Not rated | V-0 |
| | Evaluation thickness (mmt) | 0.75 | 0.75 | — | 0.75 | 0.75 | 0.38 | 0.38 | — | 0.38 |
| Intrinsic viscosity | Charging IV | 1.14 | 1.14 | 1.14 | 1.14 | 1.14 | 0.74 | 0.74 | 0.74 | 0.74 |
| | Pellet IV | 1.05 | 0.91 | 1.12 | 0.87 | 1.04 | 0.70 | 0.58 | 0.72 | 0.55 |
| | Intrinsic viscosity retention rate (%) | 92 | 80 | 98 | 76 | 91 | 95 | 78 | 97 | 74 |
| MVR (cm$^3$/10 min) | | 26 | 42 | 22 | 49 | 27 | 26 | 42 | 22 | 49 |
| Laser markability | | Δ | ○ | X | ○ | Δ | Δ | ○ | X | ○ |
| Silver plate corrosion (Level 1-3) | | LV3 | LV3 | Not carried out | LV3 | LV3 | LV3 | LV3 | Not carried out | LV3 |
| Na element concentration (ppm) | | 0.4 | 492 | Not detected | 420 | 0.3 | Not carried out | Not carried out | Not carried out | Not carried out |

Examples 21 to 22 and Comparative Examples 21 to 25

Components used that were different from the components mentioned above are as shown in Table 4 below.

TABLE 4

| Component | Simbol | |
|---|---|---|
| Pentabromobenzyl polyacrylate (B) | PBBPA 8 | Water washing: 90° C. × 3 hours bromine concentration 70 mass %, Na element concentration: 700 ppm Mg ion concentration 1200 ppm, Al ion concentration 700 ppm |
| Phosphate stabilizer | Phosphate 1 | Octadecyl acid phosphate manufactured by ADEKA Corporation, product name: ADK STAB AX-71 |
| Phosphite stabilizer | Phosphite 1 | Bis(2,6-di-t-butyl-4-methylphenyl)pentaerythritol diphosphite manufactured ADEKA Corporation, product name: ADK STAB PEP-36 |
| | Phosphite 2 | Tris(2,4-di-t-butylphenyl) phosphate manufactured by ADEKA Corporation, product name: ADK STAB 2112 |

PBBPA 8 mentioned above was obtained by washing PBBPA, which was produced using steps 1 to 4 above, for 3 hours with hot water having a temperature of 90° C.

The Na element concentration in PBBPA 8 was measured by means of X-Ray fluorescence analysis, and the Mg ion concentration and Al ion concentration in PBBPA 8 were measured by means of ICP emission spectral analysis.

Pellets were obtained by blending the components at the quantities (parts by mass in all cases) shown in Table 5 below, kneading the components by using a twin screw extruder ("TEX30α" manufactured by Japan Steel Works, Ltd.) at an extruder barrel preset temperature of 260° C. and a screw rotation speed of 200 rpm so as to extrude in the form of a strand, rapidly cooling the strand in a water bath, and then forming pellets by means of a pelletizer. Calcium stearate as a lubricant was then externally added by dry blending to the obtained pellets at a quantity of 0.1 parts by mass relative to 100 parts by mass of polybutylene terephthalate resin so as to obtain resin composition pellets.

Evaluations were carried out in the same way as described above, and the results are shown in Table 5 below.

TABLE 5

| | Example | | Comparative Example | | | | |
|---|---|---|---|---|---|---|---|
| | 21 | 22 | 21 | 22 | 23 | 24 | 25 |
| PBT 1 | 16.6 | 16.6 | 17.1 | 16.6 | 16.6 | 16.6 | 16.6 |
| PBT 2 | 83.4 | 83.4 | 82.9 | 83.4 | 83.4 | 83.4 | 83.4 |
| PBBPA 8 | 12.5 | | | | | | |
| PBBPA 1 | | 12.5 | | | | | |
| PBBPA 3 | | | 12.4 | 12.5 | 12.5 | | 70.0 |
| Phosphate 1 | 0.6 | 0.6 | | | | 0.6 | 0.6 |
| Phosphite 1 | | | | 0.6 | | | |
| Phosphite 2 | | | | | 0.6 | | |
| Sb compound | 5.5 | 5.5 | 5.5 | 5.5 | 5.5 | 5.5 | 5.5 |
| Stabilizer 1 | 0.2 | 0.2 | 0.2 | 0.2 | 0.2 | 0.2 | 0.2 |
| Release agent 1 | 0.4 | 0.4 | 0.4 | 0.4 | 0.4 | 0.4 | 0.4 |
| Lubricant | 0.1 | 0.1 | 0.1 | 0.1 | 0.1 | 0.1 | 0.1 |
| Flame retardancy (0.75 mmt) | V-0 | V-0 | V-0 | V-0 | V-0 | Not rated | V-0 |
| Intrinsic viscosity | Charging IV | 1.14 | 1.14 | 1.14 | 1.14 | 1.14 | 1.14 | 1.14 |
| | Pellet IV | 1.10 | 1.06 | 0.91 | 0.97 | 0.98 | 1.13 | 0.90 |
| | Intrinsic viscosity retention rate (%) | 96 | 93 | 80 | 85 | 86 | 99 | 79 |
| MVR (cm$^3$/10 min) | 23 | 24 | 42 | 31 | 32 | 22 | 44 |
| Laser markability | ○ | ○ | ○ | ○ | ○ | X | ○ |

Examples 31 to 32 and Comparative Examples 31 to 32

The materials shown in Table 6 below were used as the brominated polyacrylate flame retardant (B).

TABLE 6

| Component | Simbol | |
|---|---|---|
| Pentabromobenzyl polyacrylate (B) | PBBPA 9 | Polymerization solvent: chlorobenzene water washing: 90° C. × 2 hours × 2 times Mw = 27,500, Mn = 7600, Mw/Mn = 3.61, single peak, maximum peak = 30,500 bromine concentration: 70 mass % Na element concentration: not detected (X-Ray fluorescence analysis), 7 ppm (ICP) |

TABLE 6-continued

| Component | Simbol | |
|---|---|---|
| | | Mg ion concentration: not detected (X-Ray fluorescence analysis), 1 ppm (ICP) Al ion concentration: not detected (X-Ray fluorescence analysis), 1 ppm (ICP) |
| | PBBPA 2 | Polymerization solvent: dichloroethane water washing: 90° C. × 1 hour × once Mw = 33,000, Mn = 8700, Mw/Mn = 3.79, single peak, maximum peak = 34,700 bromine concentration: 70 mass % Na element concentration: 1500 ppm (X-Ray fluorescence analysis), Mg ion concentration: 1500 ppm Al ion concentration: 1600 ppm |
| | PBBPA 4 | Manufactured by ICL Co., Ltd., product name FR-1025 Mw = 31,000, Mn = 4,200, Mw/Mn = 7.38, double peak, peaks at 1500 and 44,700 bromine concentration: 70 mass % Na element concentration: not detected (X-Ray fluorescence analysis), 4 ppm (ICP) Mg ion concentration: not detected (X-Ray fluorescence analysis), not detected (ICP) Al ion concentration: not detected (X-Ray fluorescence analysis), not detected (ICP) |

PBBPA 9 in Table 6 above was obtained by twice washing PBBPA, which was produced using steps 1 to 4 above, for 2 hours with hot water having a temperature of 90° C.

The Na element concentration in PBBPA 9 was measured by means of X-Ray fluorescence analysis.

Pellets were obtained by blending the components at the quantities (parts by mass in all cases) shown in Table 7 below, kneading the components by using a twin screw extruder ("TEX30α" manufactured by Japan Steel Works, Ltd.) at an extruder barrel preset temperature of 260° C. and a screw rotation speed of 200 rpm so as to extrude in the form of a strand, rapidly cooling the strand in a water bath, and then forming pellets by means of a pelletizer. Calcium stearate as a lubricant was then externally added by dry blending to the obtained pellets at a quantity of 0.1 parts by mass relative to 100 parts by mass of polybutylene terephthalate resin so as to obtain resin composition pellets.

Evaluations were carried out in the same way as described above, and the results are shown in Table 7 below.

TABLE 7

| | | Example | | Comparative Example | |
|---|---|---|---|---|---|
| | | 31 | 32 | 31 | 32 |
| | PBT1 | 16.6 | 16.6 | 16.6 | 16.6 |
| | PBT2 | 83.4 | 83.4 | 83.4 | 83.4 |
| | PBBPA9 | | 12.4 | | |
| | PBBPA2 | 12.4 | | | |
| | PBBPA4 | | | | 12.4 |
| | Sb compound | 5.5 | 5.5 | | 5.5 |
| | Release agent 1 | 0.4 | 0.4 | 0.4 | 0.4 |
| | Lubricant | 0.1 | 0.1 | 0.1 | 0.1 |
| | Stabilizer 2 | 0.2 | 0.2 | 0.2 | 0.2 |
| Intrinsic viscosity | Charging IV | 1.14 | 1.14 | 1.14 | 1.14 |
| | Pellet IV | 1.10 | 1.16 | 1.18 | 1.18 |
| | Intrinsic viscosity retention rate (%) | 97 | 102 | 104 | 104 |
| | Flame retardancy | V-0 | V-0 | Not rated | V-0 |

TABLE 7-continued

| | Example | | Comparative Example | |
|---|---|---|---|---|
| | 31 | 32 | 31 | 32 |
| Silver plate corrosion test | LV2 | LV2 | Not carried out | LV3 |

INDUSTRIAL APPLICABILITY

The polyester resin composition of the present invention exhibits excellent flame retardancy, melt thermal stability and laser markability, and can therefore be used in a wide variety of applications, and is particularly suitable for use in electrical equipment, electronic equipment and electrical insulation components of such equipment.

The invention claimed is:

1. A polyester resin composition, comprising:
   (A) 100 parts by mass of a thermoplastic polyester resin (A); and
   (B) 3 to 60 parts by mass of a brominated polyacrylate flame retardant (B), relative to the 100 parts by mass of the thermoplastic polyester resin (A),
   wherein the brominated polyacrylate flame retardant (B) has a Na element concentration of 5 to 4000 ppm, as measured by X-Ray fluorescence analysis or by inductively coupled plasma (ICP) emission spectrometry, a Mg ion concentration of 5 to 2000 ppm and an Al ion concentration of 5 to 3000 ppm, as measured by ICP emission spectrometry.

2. The polyester resin composition according to claim 1, wherein the brominated polyacrylate flame retardant (B) has a Na element concentration of 100 to 1500 ppm.

3. The polyester resin composition according to claim 1, wherein the brominated polyacrylate flame retardant (B) is a pentabromobenzyl polyacrylate.

4. The polyester resin composition according to claim 1, wherein the brominated polyacrylate flame retardant (B) contains sodium bromide.

5. The polyester resin composition according to claim 1, further comprising:
   (C) a phosphate stabilizer (C).

6. The polyester resin composition according to claim 1, wherein the brominated polyacrylate flame retardant (B) has a ratio (Mw/Mn) of mass average molecular weight (Mw) to number average molecular weight (Mn) of 5.5 or less.

7. The polyester resin composition according to claim 1, wherein the brominated polyacrylate flame retardant (B) has a mass average molecular weight (Mw), as measured by GPC, of 10000 or more.

8. A polyester resin composition, comprising:
   (A) 100 parts by mass of a thermoplastic polyester resin (A); and
   (B) 3 to 60 parts by mass of a brominated polyacrylate flame retardant (B) relative to the 100 parts by mass of the thermoplastic polyester resin (A),
   wherein the brominated polyacrylate flame retardant (B) has a Na element concentration of 5 to 4000 ppm, a Mg ion concentration of 5 to 2000 ppm and an Al ion concentration of 5 to 3000 ppm, as measured by ICP emission spectrometry, and the polyester resin composition has a Na element concentration of 1 to 400 ppm, as measured by atomic absorption spectroscopy or by inductively coupled plasma (ICP) emission spectrometry.

9. A method for producing a polyester resin composition comprising 3 to 60 parts by mass of a brominated polyacrylate flame retardant (B) relative to 100 parts by mass of a thermoplastic polyester resin (A), the method comprising:

washing the brominated polyacrylate flame retardant (B) with hot water having a temperature of 40° C. to 100° C.; then drying the washed product to obtain a dried product having a Na element concentration of 5 to 4,000 ppm, as measured by X-Ray fluorescence analysis or by inductively coupled plasma (ICP) emission spectrometry; and then mixing the dried product with the thermoplastic polyester resin (A).

* * * * *